United States Patent
Kobayashi et al.

(10) Patent No.: US 6,333,905 B2
(45) Date of Patent: *Dec. 25, 2001

(54) OPTICAL DISK, OPTICAL DISK DEVICE, AND OPTICAL DISK RECORDING METHOD

(75) Inventors: Seiji Kobayashi, Kanagawa; Koji Fujimiya, Tokyo, both of (JP)

(73) Assignee: Sony Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/252,609

(22) Filed: Feb. 4, 1999

Related U.S. Application Data

(62) Division of application No. 08/890,625, filed on Jul. 9, 1997, now Pat. No. 6,226,243.

(30) Foreign Application Priority Data

Jul. 16, 1996 (JP) .................................................. 8-205292

(51) Int. Cl.$^7$ ............................................... G11B 7/00
(52) U.S. Cl. ..................................... 369/59.11; 369/47.18
(58) Field of Search ........................... 369/116, 59, 48, 369/47, 53, 54

(56) References Cited

U.S. PATENT DOCUMENTS

| | | | |
|---|---|---|---|
| 4,817,077 | * 3/1989 | Ono | 369/48 |
| 4,835,759 | * 5/1989 | Saito et al. | 369/116 |
| 4,866,692 | * 9/1989 | Saito et al. | 369/48 |
| 4,932,017 | * 6/1990 | Van Uijen | 369/48 |
| 4,965,782 | * 10/1990 | Mathews | 369/48 |
| 5,001,692 | * 3/1991 | Farla et al. | 369/48 |
| 5,172,352 | 12/1992 | Kobayashi | 369/44.26 |
| 5,258,970 | 11/1993 | Kobayashi | 369/109 |
| 5,345,434 | 9/1994 | Ide et al. | 369/124 |
| 5,347,505 | 9/1994 | Moritsugu et al. | 369/59 |
| 5,398,231 | 3/1995 | Shin et al. | 369/275.4 |
| 5,400,319 | 3/1995 | Fite et al. | 369/275.5 |
| 5,412,635 | 5/1995 | Maeda | 369/44.26 |
| 5,418,770 | * 5/1995 | Ide et al. | 369/48 |

(List continued on next page.)

FOREIGN PATENT DOCUMENTS

| | | |
|---|---|---|
| 4311683 A1 | 10/1994 | (DE) . |
| 0477892 A2 | 4/1992 | (EP) . |
| 0484555 A1 | 5/1992 | (EP) . |
| 0552936 A1 | 7/1993 | (EP) . |
| 2250626 A | 6/1992 | (GB) . |
| 7-272325 | 10/1995 | (JP) . |

OTHER PUBLICATIONS

Patent Abstracts of Japan, vol. 018, No. 519 (P–1807), Sep. 29, 1994, JP 6–176430, Canon Inc., Published Jun. 24, 1994.
Patent Abstracts of Japan, vol. 013, No. 082 (P–833), Feb. 23, 1989, JP 96–263633, Matsushita Electric Inc. Co. Ltd., Published Oct. 31, 1988.
S. Kubota, "Aplanatic Condition Required to Reproduce Jitter–Free Signals in an Optical Digital Disk System," 1987 Optical Society of America, Applied Optics, vol. 26, No. 18, Sep. 15, 1987, pp. 3961–3973

* cited by examiner

Primary Examiner—Nabil Hindi
(74) Attorney, Agent, or Firm—Oblon, Spivak, McClelland, Maier & Neustadt, P.C.

(57) ABSTRACT

The present invention relates to an optical disk, an optical disk device, and an optical disk recording method. When it is applied to, for example, a compact disk. It attempts to reduce a jitter at the time of reproduction, and reproduce surely the recorded data. A change pattern of a modulation signal (S2) is detected, and the timing of a modulation signal (S1) is corrected according to this change pattern, to irradiate a laser beam L.

3 Claims, 9 Drawing Sheets

U.S. PATENT DOCUMENTS

| | | | |
|---|---|---|---|
| 5,450,381 | 9/1995 | Tsukamura et al. | 369/13 |
| 5,475,672 * | 12/1995 | Le Carvennec | 369/48 |
| 5,517,481 | 5/1996 | Kobayashi | 369/124 |
| 5,523,991 * | 6/1996 | Mizokami et al. | 369/48 |
| 5,533,003 | 7/1996 | Kobayashi | 369/275.4 |
| 5,557,592 * | 9/1996 | Kobayashi et al. | 369/59 |
| 5,557,593 * | 9/1996 | Baily | 369/59 |
| 5,566,158 | 10/1996 | Kobayashi et al. | 369/59 |
| 5,577,012 * | 11/1996 | Kobayashi et al. | 369/48 |
| 5,608,717 | 3/1997 | Ito et al. | 369/275.3 |
| 5,608,718 | 3/1997 | Schiewe | 369/275.4 |
| 5,612,938 * | 3/1997 | Dohmeier et al. | 369/48 |
| 5,615,193 | 3/1997 | Kobayashi et al. | 369/59 |
| 5,622,816 | 4/1997 | Maenza et al. | 430/347 |
| 5,636,194 * | 6/1997 | Furumiya et al. | 369/48 |
| 5,682,374 | 10/1997 | Horigome et al. | 369/275.3 |
| 5,699,337 | 12/1997 | Kobayashi | 369/59 |
| 5,703,853 | 12/1997 | Horigome et al. | 369/48 |
| 5,724,330 | 3/1998 | Kobayashi et al. | 369/59 |
| 5,729,514 | 3/1998 | Horigome et al. | 369/58 |
| 5,729,518 | 3/1998 | Kobayashi | 369/59 |
| 5,748,582 | 5/1998 | Kobayashi et al. | 369/44.26 |
| 5,748,586 | 5/1998 | Kobayashi et al. | 369/48 |
| 5,748,607 | 5/1998 | Ohira et al. | 369/275.4 |
| 5,751,690 | 5/1998 | Ohira et al. | 369/275.1 |
| 5,768,235 | 6/1998 | Huber | 369/59 |
| 5,798,996 * | 8/1998 | Arai | 369/116 |
| 5,825,742 | 10/1998 | Tanaka et al. | 369/116 |
| 5,828,640 | 10/1998 | Kobayashi | 369/59 |
| 5,848,041 | 12/1998 | Hirayama et al. | 369/59 |
| 5,848,043 | 12/1998 | Takada et al. | 369/116 |
| 5,878,020 | 3/1999 | Takahashi | 369/275.3 |
| 5,946,286 | 8/1999 | Bahns | 369/275.3 |
| 5,982,737 | 11/1999 | Takagishi et al. | 369/275.1 |

F I G. 9
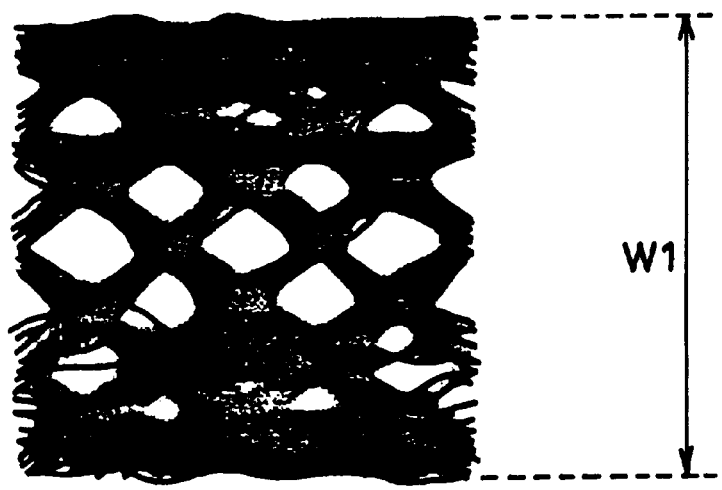
F I G. 10
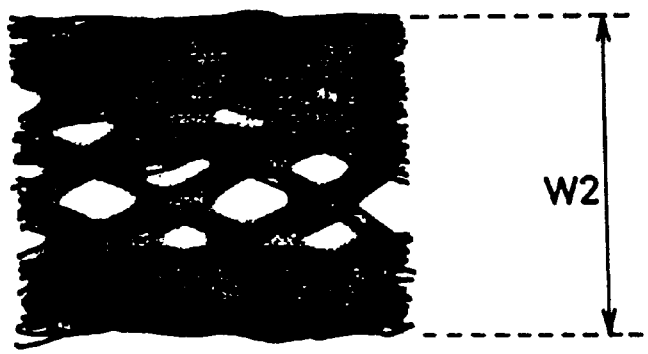

OPTICAL DISK, OPTICAL DISK DEVICE, AND OPTICAL DISK RECORDING METHOD

This is a divisional of application Ser. No. 08/890,625, filed Jul. 9,1997 now U.S. Pat. No. 6,226,243.

BACKGROUND OF THE INVENTION

1. Field of the Invention

The present invention relates to an optical disk, an optical disk device, and an optical disk recording method. The present invention is applied to, for example, a compact disk. By correcting the timing of a modulation signal according to a change pattern of a modulation signal, a jitter at the time of reproduction is reduced and recorded data can be surely reproduced.

2. Description of the Related Art

In a conventional compact disk, data to be recorded are subjected to data processing and thereafter subjected to an EFM (Eight-to-Fourteen Modulation) modulation. For a predetermined fundamental period T, a pit sequence having a period in the range of 3T to 11T is thereby formed. Thereby, audio data or the like, for example, are recorded.

Corresponding to this, a compact disk player irradiates a laser beam on the compact disk and receives a returned light therefrom. The compact disk player thus obtains a reproduced signal having a signal level changed according to the light quantity of the returned light, converts this reproduced signal to a binary value by using a predetermined slice level, and thus generates a binary signal. Furthermore, the compact disk player drives a PLL circuit in response to this binary signal to generate a reproduction clock and latches binary signals successively by using the reproduction clock. Thereby, the compact disk player generates reproduced data having a period in the range of 3T to 11T and corresponding to the pit sequence formed on the compact disk.

The compact disk player conducts data processing corresponding to the data processing conducted at the time of recording, on the reproduced data thus generated. In this way, the compact disk player reproduces audio data or the like recorded on the compact disk.

By the way, in the conventional compact disk player, a jitter is contained in the reproduced signal. It may be considered that this jitter occurs by various causes such as a noise of a laser beam used for readout, a thermal noise of an electric system, a disk noise or the like. The jitter reduces the phase margin of the reproduced signal. In an extreme case, the jitter makes it difficult to reproduce data correctly.

However, this jitter is essentially due to an inter-symbol interference caused by preceding and succeeding pits (Shigeo Kubota, "Aplanatic condition required to reproduce jitter-free signals in an optical digital disk system", App. Optics 1987, Vol. 26, No. 18, pp. 3961–3970). The jitter changes according to the land and pit located before and behind the laser beam radiation position.

SUMMARY OF THE INVENTION

In view of the points heretofore described, the present invention has been made. The present invention attempts to propose an optical disk, an optical disk device, and an optical disk recording method capable of reducing a jitter caused at the time of reproduction and reproducing surely the recorded data.

In order to solve the above described problems, in an optical device and an optical disk recording method according to the present invention, the timing of a modulation signal is corrected according to a change pattern of the modulation signal.

Furthermore, in an optical disk, the position of an edge is changed from its fundamental position according to the pit length and the land length located before and behind the edge.

Furthermore, in an optical disk device and an optical disk recording method, the timing at which a laser beam is raised up to a light quantity for writing is corrected in an interlinked relation to light quantity switching of the writing operation.

Furthermore, in an optical disk, a high reflectance area and a low reflectance area are formed dependent on a difference in pit width. In order to correct a change of a returned light caused by this difference in pit width, pits to which the same data is assigned are formed so as to be different in pit length.

By correcting a timing of the modulation signal, a change caused in signal level at the time of reproduction can be corrected. If this timing correction is executed on the basis of the change pattern of the modulation signal, a reproduced signal can be corrected so as to correct an inter-symbol interference changing according to this change pattern. As a result, the jitter of the reproduced signal can be reduced.

So as to correspond to this in an optical disk, the position of an edge is changed from a fundamental position according to the pit length and the land length located before and behind the edge to thereby form the pit. Whereby, the pit shape is changed so as to correspond to the change pattern of the modulation signal. As a result, a jitter caused by inter-symbol interference can be avoided.

Furthermore, if the timing at which the laser beam is raised up to the light quantity for writing is corrected in an interlinked relation to light quantity switching of the writing operation, asymmetry changed by light quantity switching can be corrected.

So as to correspond to this, in an optical disk, a high reflectance area and a low reflectance areas are formed dependent on a difference in pit width. Thereby, characters or the like can be recorded on the information recording surface so as to be observable with eyes. If at this time pits to which the same data is assigned are formed so as to be different in pit length so as to correct a change of a returned light caused by this difference in pit width, asymmetry differing in the high reflectance area and the low reflectance area can be corrected.

BRIEF DESCRIPTION OF THE DRAWINGS

FIG. 9 is a signal waveform diagram showing a reproduced signal of a portion of the compact disk using a light quantity of 100%;

FIG. 10 is a signal waveform diagram showing a reproduced signal of a portion of the compact disk using a light quantity of 85%;

DESCRIPTION OF THE PREFERRED EMBODIMENTS

Hereafter, an optical disk, an optical disk device, and an optical disk recording method according to embodiments of the present invention will be described by suitably referring to the accompanying drawings.

(1) First Embodiment

Figure 1:
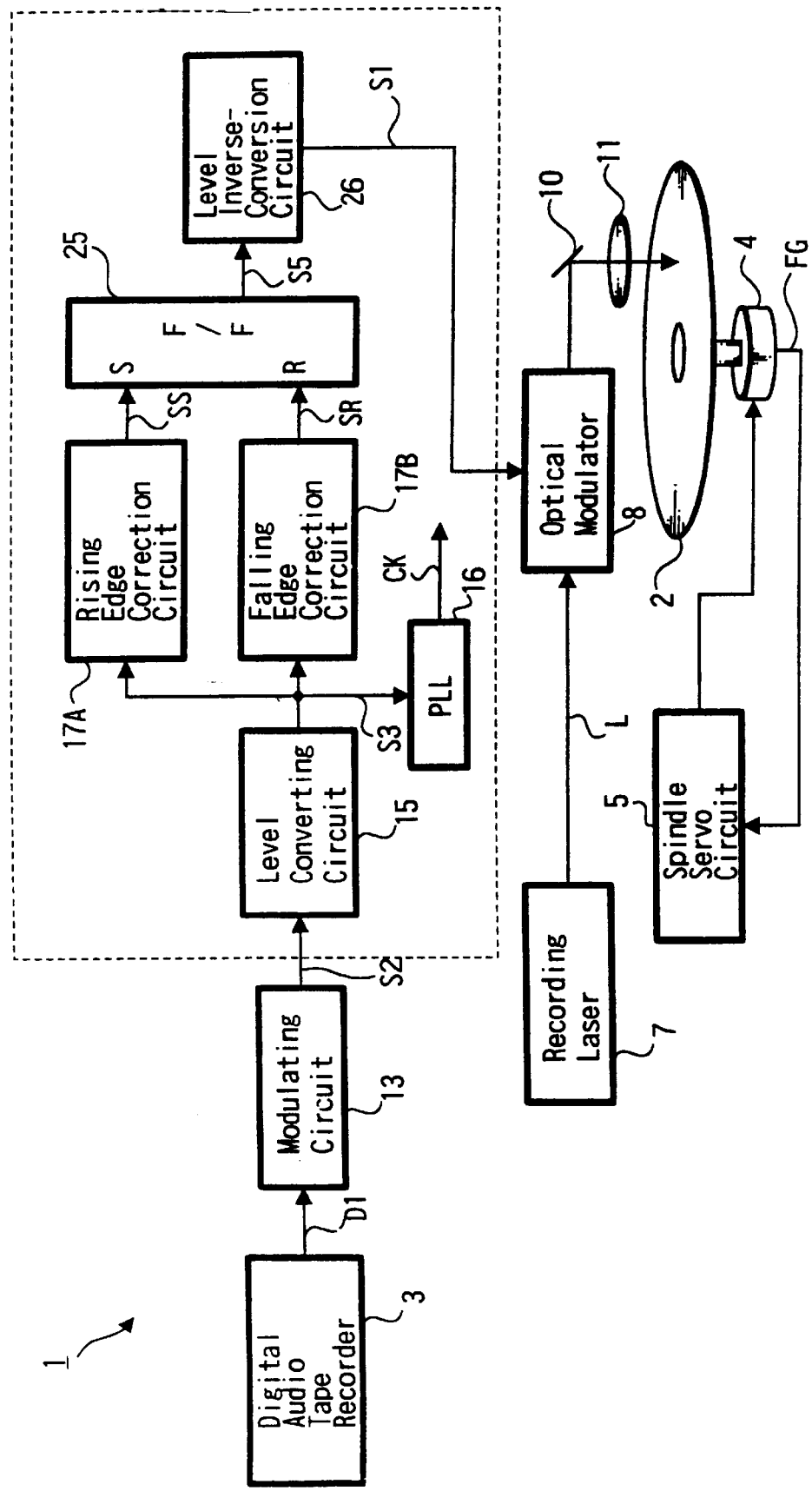
FIG. 1 is a block diagram showing an optical disk device according to a first embodiment of the present invention.

FIG. 1 is a block diagram showing an optical disk device according to an embodiment of the present invention. This optical disk device 1 records audio data D1 output from a digital audio tape recorder 3 by exposing an original disk 2 to a light. In a manufacturing process of an optical disk, this original disk 2 is subjected to development, and then subjected to electroforming processing. Thereby, a mother disk is produced. From this mother disk, a stamper is produced. Furthermore, in the optical disk manufacturing process, a disk-like substrate is produced from the stamper thus produced. By forming a reflective film and a protective film on this disk-like substrate, a compact disk is produced.

That is, in this optical disk device 1, a spindle motor 4 drives and rotates the original disk 2. From an FG signal generator held at the bottom thereof, there is output an FG signal FG having a signal level which rises up at every predetermined rotation angle. According to the exposure position of the original disk 2, a spindle servo circuit 5 drives the spindle motor 4 so as to make the frequency of this FG signal equivalent to a predetermined frequency. As a result, the original disk 2 is driven so as to be rotated under the condition of a constant linear velocity.

A recording laser 7 is formed by a gas laser or the like, and emits a laser beam L for exposure of the original disk. A light modulator 8 is formed of an electro-acousto-optical element and effects on-off control on the laser beam L by using a modulation signal S1 to emits a resultant beam. A mirror 10 bends the optical path of this laser beam L and emits a resultant beam toward the original disk 2. An objective lens 11 focuses the light reflected by the mirror 10 on the original disk 2. The mirror 10 and the objective lens 11 are successively moved in the radial direction of the original disk 2 in synchronism with the rotation of the original disk 2 by a sled mechanism which is not illustrated. As a result, the position of exposure to the laser beam L is successively displaced in the outer peripheral direction of the original disk 2.

In such a state that the original disk 2 is driven and rotated in this optical disk device 1, a track is formed so as to take a helical shape by the movement of the mirror 10 and the objective lens 11, and pits are successively formed on this track so as to correspond to the modulation signal S1.

The audio data D1 is inputted from the digital audio tape recorder 3 to a modulation circuit 13. In addition, subcode data corresponding to the audio data D1 is inputted to the modulation circuit 13. The modulation circuit 13 conducts data processing on the audio data D1 and the subcode data by using a data processing scheme stipulated for a compact disk. In other words, the modulation circuit 13 adds error correction codes to the audio data D1 and the subcode data, thereafter conducts interleave processing thereto, subsequently conducts an EFM modulation, and outputs an EFM signal S2.

An edge position correction circuit 14 detects a change pattern of the EFM signal S2 and corrects the timing of the EFM signal S2 so as to effectively avoid the inter-symbol interference at the time of reproduction according to this change pattern.

Specifically, in the edge position correction circuit 14, a level conversion circuit 15 corrects the signal level of the EFM signal S2 having an output amplitude value of 1 [V] to a TTL level having an output amplitude value of 5 [V]. A resulting signal is outputted therefrom. A PLL circuit 16 generates a clock CK (FIG. 2B) from the EFM signal S2 (FIG. 2A), and outputs the clock CK. In the FFM signal S2, the signal level changes with a period in the range of 3T to 11T for the fundamental period T. Therefore, the PLL circuit 16 thus generates the clock CK which changes in signal level according to the fundamental period T synchronized to this EFM signal S2.

Figure 3:
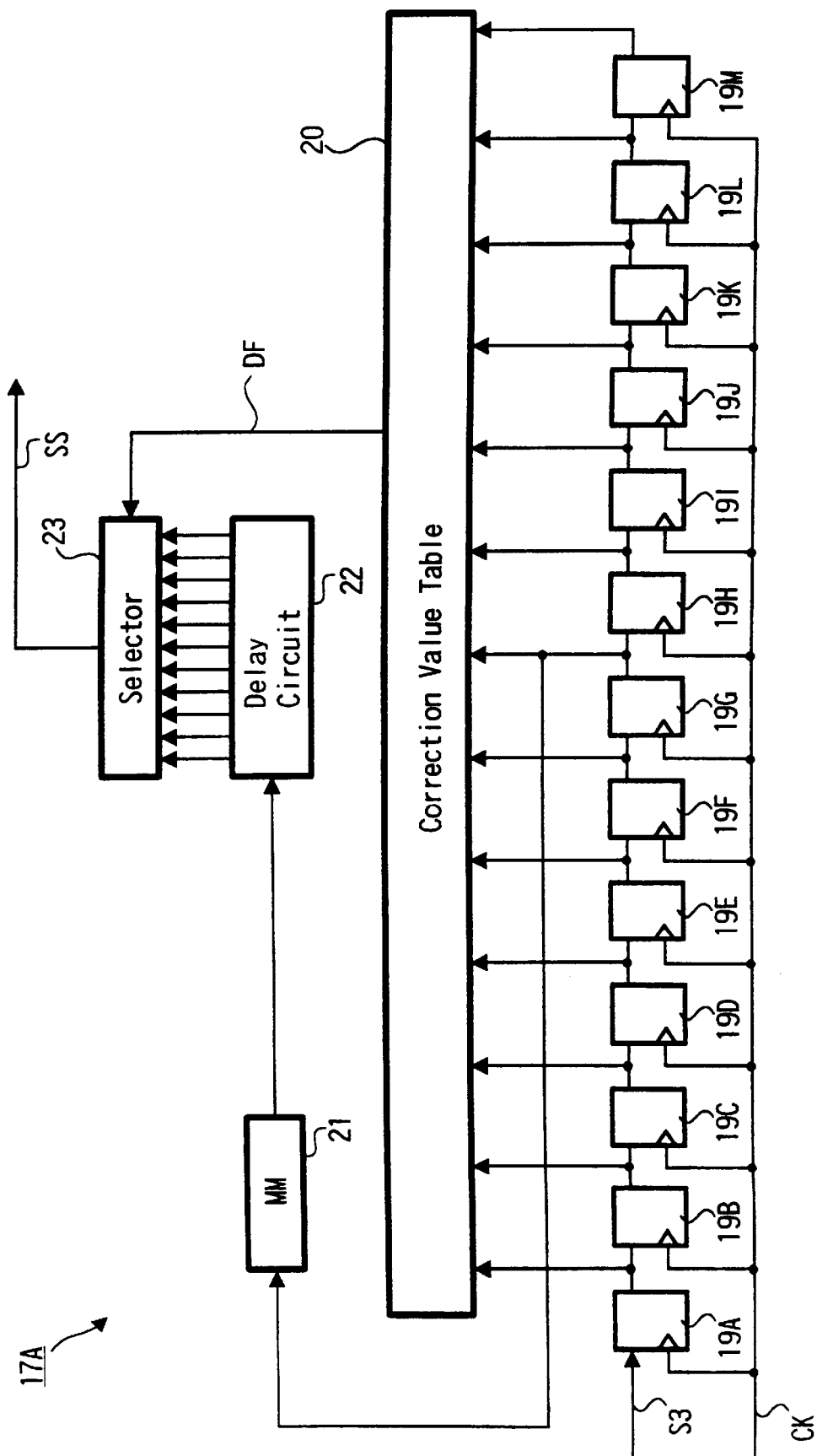
FIG. 3 is a block diagram showing a rising edge correction circuit included in the optical disk device of FIG. 1.

As shown in FIG. 3, a rising edge correction circuit 17A includes thirteen latch circuits 19A through 19M connected in series and operated by the clock CK. An output signal S3 of the level conversion circuit 15 is inputted to the series circuit of the latch circuits 19A to 19M. The rising edge correction circuit 17A samples the output signal S3 of the level conversion circuit 15 with the timing of the clock CK, and detects the change pattern of the EFM signal S2 on the basis of sampling results of thirteen consecutive points. Namely, in the case where a latch output of, for example, "0001111000001" is obtained, it can be recognized as a change pattern containing pits of a length 4T continued after a space of a length 5T. In the same way, in the case where a latch output of, for example, "0011111000001" is obtained, it can be recognized as a change pattern containing pits of a length 5T continued after a space of a length 5T.

A correction value table 20 is formed of a read only memory storing a plurality correction data. By using latch outputs of the latch circuits 19A through 19M as an address, the correction value table 20 outputs correction value data DF corresponding to the change pattern of the EFM signal S2. As an input, a monostable multivibrator (MM) 21 receives the latch output of the latch circuit 19G located at the center of thirteen latch circuits 19A to 19M connected in series. By using the rising timing of this latch output as a reference, the monostable multivibrator 21 outputs a rising pulse signal which is raised in signal level for a predetermined interval of time (an interval sufficiently shorter than the period 3T).

A delay circuit 22 has tap outputs of twelve stages. The delay time difference between the respective taps is set equal to the resolution of timing correction of the modulation signal in the edge position correction circuit 14. The delay circuit 22 successively delays the rising pulse signal outputted from the monostable multivibrator 21 and outputs the delayed signal from each tap. A selector 23 selects and outputs a tap output of the delay circuit 22 according to the correction value data DF. As a result, a rising pulse signal SS (FIG. 2(D)) changed in delay time according to the correction value data DF is selected and outputted from the selector 23.

Thereby, the rising edge correction circuit 17A generates the rising edge signal SS which rises in signal level in response to each rising of the signal level of the EFM signal S2. The delay time of each rising edge with respect to the EFM signal S2, such as $\alpha r(3, 3)$, $\alpha r(4, 3)$, $\alpha(3, 4)$, $\alpha r(5, 3)$, ... is changed according to the change pattern of the EFM signal S2 detected by the corresponding rising edges of the EFM signal S2, i.e., by thirteen sampling operations before and after in total.

Figure 2:
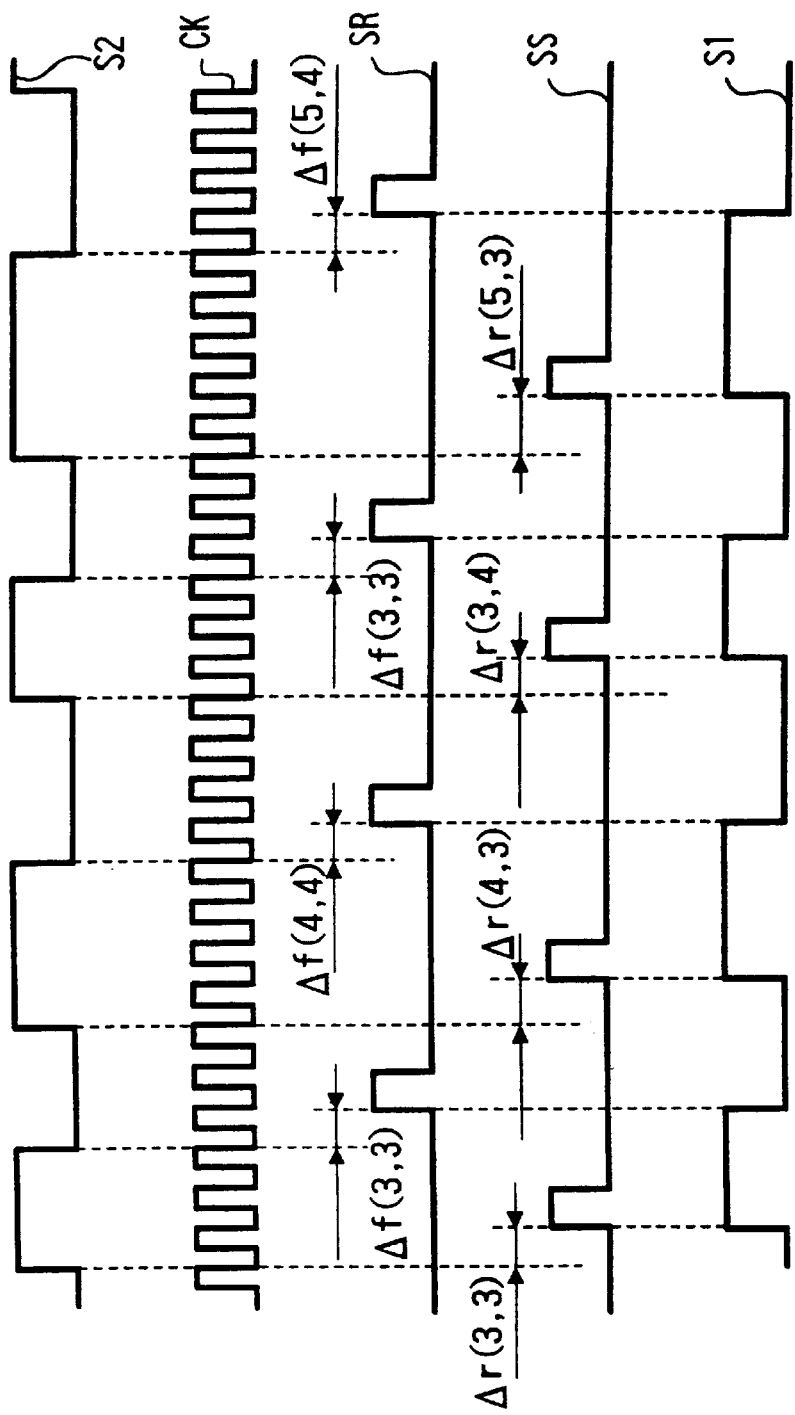
FIGS. 2A to 2E are each a signal waveform diagram used for description of the operation of an edge position correction circuit included in the optical disk device of FIG. 1.

In FIG. 3, the change pattern of the modulation signal S2 is represented by a pit length p and a pit interval b while taking one period of the clock (i.e., channel clock) CK as the unit. The delay time from the rising edge is represented by $\alpha r(p, b)$. In FIG. 2D, therefore, the second delay time $\alpha r(4, 3)$ is the delay time in the case where a blank of three clocks precedes a pit having a length of four clocks. In the correction value table 20, correction value data DF corresponding to all combinations of p and b are stored beforehand.

In general, the compact disk is exposed to the laser beam L according to the EFM signal S2 and pits are thus formed thereon. For the range of 12T where the fundamental period T is taken as the unit, the rising edge correction circuit 17A detects the pattern of pits formed on the compact disk, and generates the rising edge signal SS according to this pattern.

A falling edge correction circuit 17B has the same configuration as the rising edge correction circuit 17A except that the monostable multivibrator 21 is operated on the basis of the falling edge of the latch output and contents of the correction value table 20 are different.

Thereby, the falling edge correction circuit 17B generates a falling edge signal SR (FIG. 2C) which rises in signal level in response to each falling of the signal level of the EFM signal S2. The delay time of each falling edge with respect to the EFM signal S2, such as $\alpha f(3,3)$, $\alpha f(4,4)$, $\alpha f(3,3)$, $\alpha f(5,4)$, ... is changed according to the change pattern of the EFM signal S2 detected by the corresponding falling edges of the EFM signal S2, i.e., by thirteen sampling operations in total. In FIG. 3, the delay time from each falling edge is represented by $\alpha f(p, b)$ by using the pit length p and the pit space b in the same way as the delay time for a rising edge.

For the range of 12T where the fundamental period T is taken as the unit, the falling edge correction circuit 17B detects the pattern of pits formed on the compact disk, corrects the timing of a falling edge of the EFM signal S2 functioning as the timing of termination of exposure to the laser beam according to the pattern, and generates the falling edge signal SR.

A flip-flop (F/F) 25 (FIG. 1) combines the rising edge signal SS and the falling edge signal SR, and outputs a resultant signal. In other words, the rising edge signal SS and the falling edge signal SR are input to a set terminal S and a reset terminal R of the flip-flop 25, respectively. As a result, the flip-flop 25 generates a modulation signal S5 which rises in signal level in response to each rising edge of the signal level of the rising edge signal SS and which then falls in signal level in response to each rising edge of the signal level of the falling edge signal SR. A level inverse conversion circuit 26 corrects the signal level of this modulation signal S5 having an output amplitude of a TTL level, and outputs it with the original output amplitude of 1 V.

As a result, the modulation signal S1 is outputted with the timing of the rising edge and the falling edge corrected according to the pit length and land length located before and behind. Corresponding to this, the timing of exposure of the original disk 2 to the laser beam L is also corrected according to the pit length and land length located before and behind. In the compact disk produced by this original disk 2, therefore, each edge position is changed from its fundamental position according to the pit length and land length located before and behind. As a result, between pits having the same data allocated thereto, the pit length is changed. Thereby, the optical disk device 1 corrects the positions of the front edge and the rear edge of each pit at the time of reproduction so as to reduce the jitter caused by the inter-symbol interference.

Figure 4:
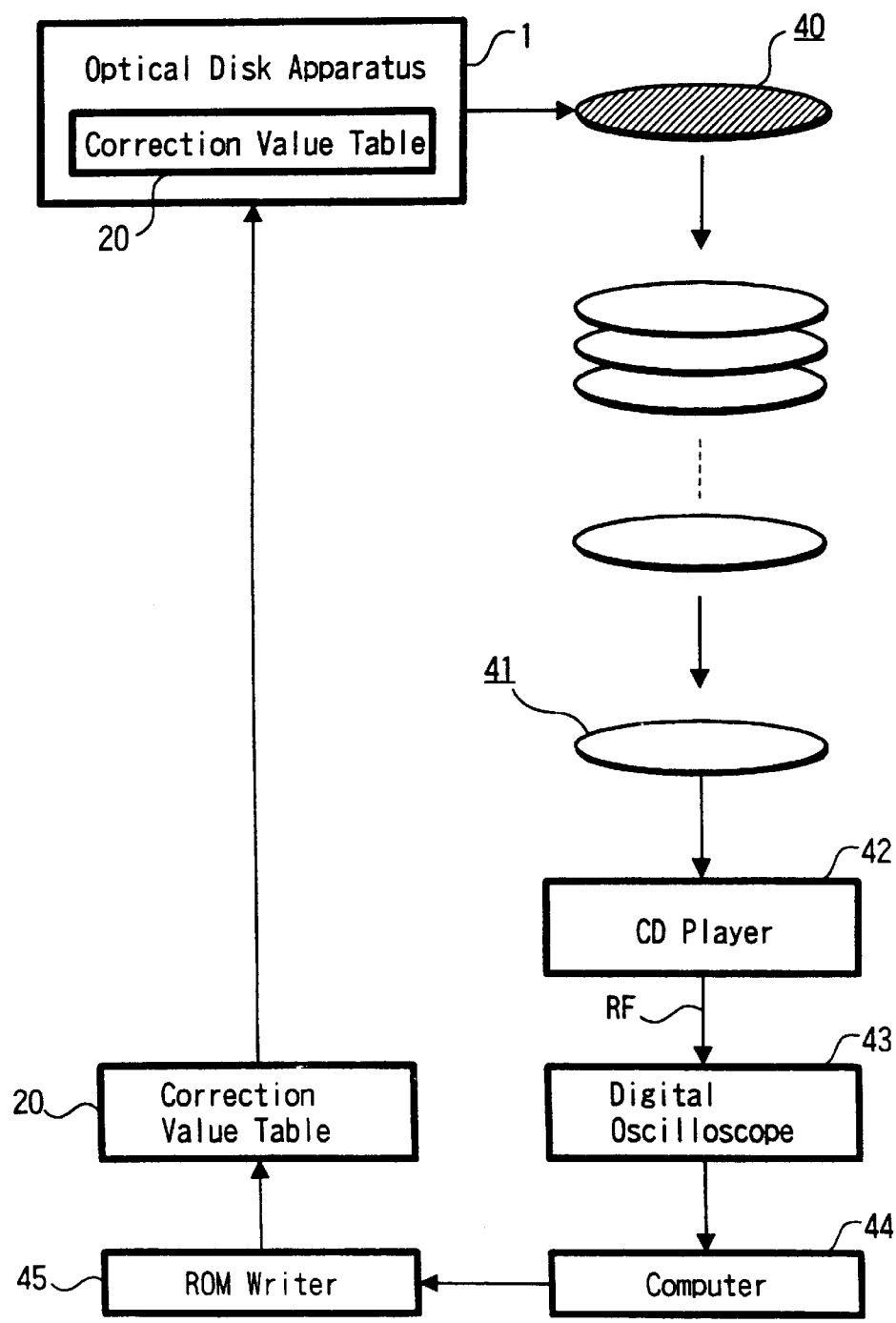
FIG. 4 is a process diagram showing the production process of a correction value table included in the optical disk device of FIG. 1.

FIG. 4 is a process diagram for the explanation of the generation of the correction value table 20 thus used to correct the edge timing. By suitably setting this correction value table 20 in the optical disk device 1, positions of the front edge and the rear edge of each pit can be set to optimum positions, and reproduced signals can be changed according to correct timing synchronized to the clock CK. specifically, even if the pit size and lengths of the preceding and succeeding blanks change, reproduced signals thus pass through a predetermined slice level at correct timing synchronized to the clock CK. As a result, reproduced signals reduced in jitter can be obtained. The correction value table 20 is present in both the rising edge correction circuit 17A and the falling edge correction circuit 17B. Its setting method is the same for both of them. Therefore, explanation will now be limited to the rising edge correction circuit 17A.

In this process, a correction value table is set on an original disk for evaluation by the optical disk device 1 on the basis of the result of reproduction of a compact disk produced from this original disk.

When this original disk for evaluation is produced, the correction value table 20 for evaluation reference is set in the optical disk device 1. In this correction value table 20 for evaluation reference, the correction value data DF is set so as to always select and output the center tap output of the delay circuit 22 by the selector 23. In this process, therefore, the original disk 2 is exposed to light under the same condition as in the case where the light modulator 8 is driven directly by the EFM signal S3, i.e., under the same condition as the conventional compact disk producing process.

In this process, the original disk 2 thus exposed to light is subjected to development, and then subjected to electroforming processing. Thereby, a mother disk is produced. From this mother disk, a stamper 40 is produced. Furthermore, in the same way as the conventional compact disk producing process, a compact disk 41 is produced from the stamper 40.

A compact disk player (CD player) 42 conducts reproduction operation for the compact disk 41 for evaluation thus produced. At this time, the compact disk player 42 switches its operation under the control of a computer 44, and outputs a reproduced signal RF from its internal signal processing circuit to a digital oscilloscope 43. This reproduced signal RF has a signal level changed according to the light quantity of the returned light which is obtained from the compact disk and is output from an output of an optical pickup via a predetermined buffer circuit. Thus, this compact disk 41 is produced under the same condition as the usual compact disk. If this reproduced signal RF is observed on the digital oscilloscope 43 by using the reproduced clock as a trigger, therefore, a jitter can be observed.

The digital oscilloscope 43 switches its operation under the control of the computer 44, conducts analog-digital conversion on the reproduced signal RF with a sampling frequency which is 20 times as high as the frequency of the channel clock, and outputs a resultant digital signal to the computer 44.

In addition to controlling the operation of the digital oscilloscope 43, the computer 44 conducts signal processing on the digital signal output from the digital oscilloscope 43, and thereby successively calculates the correction value data DF. Furthermore, the computer 44 drives a ROM writer 45 to store the calculated correction value data DF successively in a read only memory, and thereby forms the correction value table 20. In this process, a compact disk is finally manufactured by using this correction value table 20.

Figure 5:
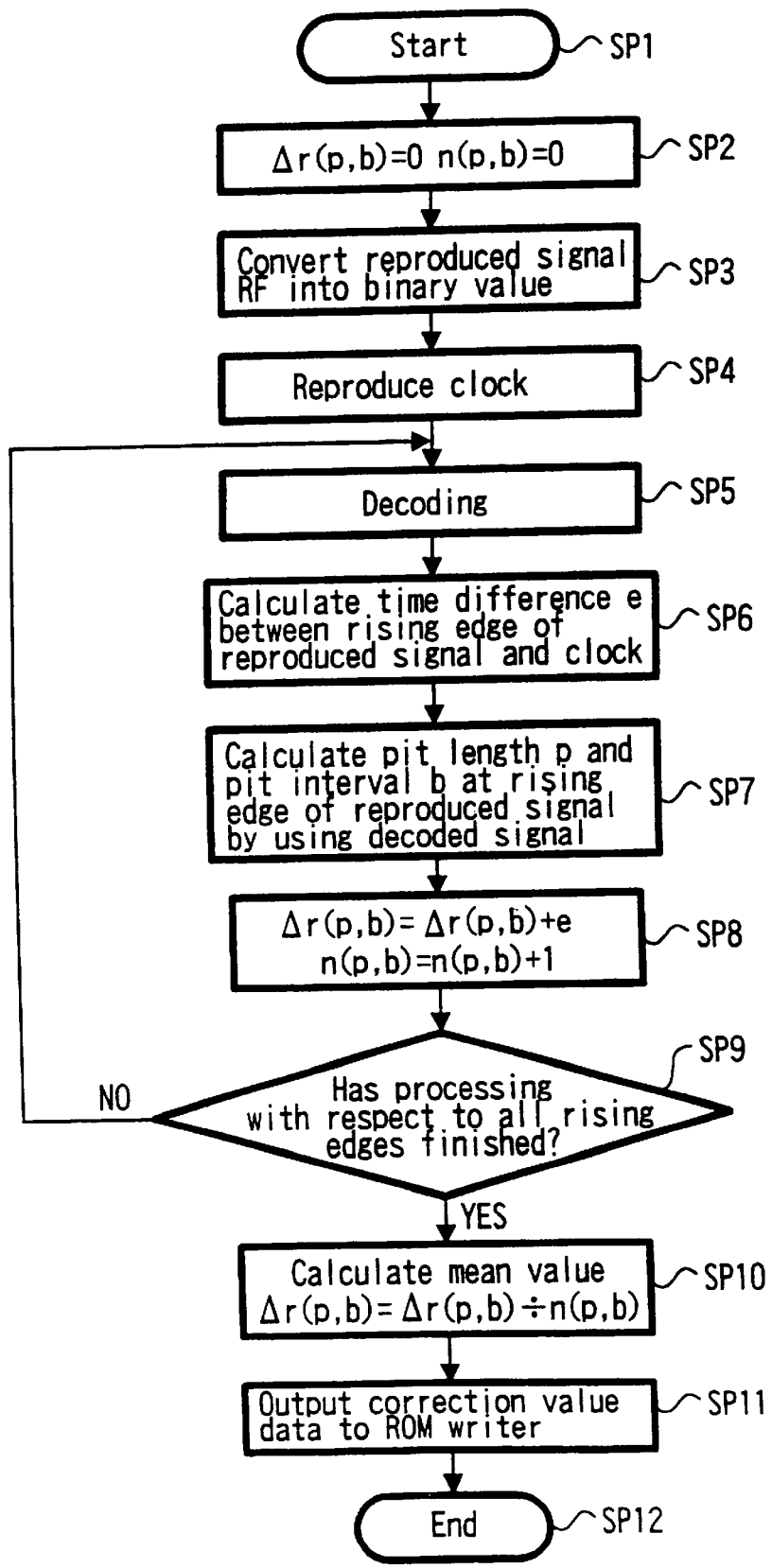
FIG. 5 is a flow chart showing the processing procedure of a computer in the process of FIG. 4.

FIG. 5 is a flow chart showing the processing procedure in the computer 44. In this processing procedure, the computer 44 proceeds from step SP1 to step SP2, and sets a jitter detection result $\alpha r(p,b)$ and the number of times of jitter measurement $n(p,b)$ equal to values 0. Around each edge which is the subject of jitter detection, the computer 44 calculates the jitter detection result $\alpha r(p,b)$ for each combination of the pit length p and the pit interval b, and counts the number of times of jitter measurement $n(p,b)$. At step SP2, therefore, the computer 44 sets all of the jitter detection result $\alpha r(p,b)$ and the number of times of jitter measurement $n(p,b)$ equal to initial values.

Subsequently, the computer 44 proceeds to step SP3. By comparing the digital signal output from the digital oscilloscope 43 with a predetermined slice level, the computer converts the reproduced signal RF to a binary value and thus generates a digital binary signal. In this processing, the computer 44 converts the digital signal to a binary value so as to provide a digital signal of the slice level or higher with a value 1 and provide a digital signal of less than the slice level with a value 0.

Subsequently, the computer 44 proceeds to step SP4, and generates a reproduced clock from a binary signal formed digital signal. Here, the computer 44 simulates the operation of the PLL circuit by conducting computation processing on the basis of the binary signal, and thereby generates the reproduced clock.

In subsequent step SP5, the computer 44 samples the binary signal at timing of each falling edge of the reproduced clock thus generated, and thereby decodes the EFM signal. (Hereafter, this EFM signal thus decoded is referred to as a decoded EFM signal.) Subsequently, the computer 44 proceeds to step SP6, and detects a time difference e measured from the time point of a rising edge of the binary signal to the time point of a falling edge of the reproduced clock closest to the former cited falling edge. Thereby, the computer 44 measures the time of jitter at this edge. Subsequently at step SP7, the computer 44 detects the preceding and succeeding pit length p and pit interval b from the decoded EFM signal for the edge the time of which has been measured at the step SP6.

Subsequently at step SP8, the computer 44 adds the time difference e detected at the step SP6 to the jitter detection result $\alpha r(p,b)$ corresponding to the preceding and succeeding pit length p and pit interval b, and increases the corresponding number of times of jitter measurement $n(p,b)$ by a value of 1. Subsequently, the computer 44 proceeds to step SP9, and determines whether or not the time measurements for all rising edges have been completed. If a negative result is obtained here, the computer returns to the step SP5.

As a result, the computer 44 repeats the processing procedure of steps SP5-SP6-SP7-SP8-SP9-SP5, accumulates the jitter detection results measured for time every change pattern appearing in the reproduced signal RF, and counts the number of additions.

If jitter time measurements for all edges have thus been completed, an affirmative result is obtained at the step SP9. As a result, the computer 44 proceeds to step SP10. For each change pattern appearing in the reproduced signal RF, the computer averages the jitter detection results measured for time. Namely, the jitter detected at the step SP6 is influenced by a noise. By thus averaging the jitter detection results, the computer 44 improves the precision of jitter measurement.

Upon thus averaging the jitter detection results, the computer 44 subsequently proceeds to step SP11. On the basis of the detection result, the computer generates the correction value data DF for each change pattern and outputs each correction value data DF to the ROM writer 45. Denoting the delay time difference between taps in the delay circuit 22 by τ, this correction value data DF is calculated by executing the computation processing of the following equation (1).

$$Hr1(p, b) = \frac{-a \cdot \Delta r(p, b)}{\tau} + Hr0(p, b) \qquad (1)$$

Here, Hr1(p,b) denotes a tap of the delay circuit 22 selected by the correction value data DF. In case of the value 0, the center tap is represented. Furthermore, Hr0(p,b) denotes a tap of the delay circuit 22 selected by the correction value data DF which is the initial value. In this embodiment, Hr0(p, b) is preset to 0. Furthermore, "a" is a constant. In this embodiment, "a" is set to a value of 1 or less (for example, such as 0.7 or the like). Multiplication is conducted so as to be capable of making the correction value surely converge even if there is an influence of a noise or the like.

Upon thus storing the correction value data DF in the ROM writer 45, the computer 44 proceeds to step SP12 and terminates this processing procedure. Subsequently, the computer 44 executes a similar processing procedure for falling edges of the digital binary signal, and thereby completes the correction value table 20.

In the configuration heretofore described, the correction value tables 20 in the rising edge correction circuit 17A and the falling edge correction circuit 17B included in the optical disk device 1 (FIG. 1) are set equal to initial values. Under the same condition as the production condition of the conventional disk, the original disk 2 for evaluation is produced (FIG. 4). From this original disk 2, the compact disk 41 for evaluation is produced.

In the compact disk 41 for evaluation, by the EFM signal changing in signal level with a period equivalent to an integer multiple of the fundamental period T, the laser beam L is subjected to on-off control. The original disk 2 is successively exposed to light, and pits are formed. In the compact disk 41 for evaluation, therefore, the reproduced signal undergoes inter-symbol interference from the adjacent pit and land. Therefore, the timing at which the reproduced signal obtained from this compact disk 41 crosses the slice level changes according to the shape of the pit and land located before and behind, i.e., according to the change pattern of the EFM signal. Thus, a jitter occurs.

This compact disk 41 undergoes the reproduction operation conducted by the compact disk player 42. The reproduced signal RF is converted to a digital signal by the digital oscilloscope 43. Thereafter, the binary signal, the decoded EFM signal, and the reproduced clock are generated by the computer 44. Furthermore, for each edge of the binary signal from the compact disk 41, the pit and land located before and after are detected from the decoded EFM signal, and the change pattern of the EFM signal is detected. For each change pattern, the jitter quantity of each edge for the reproduced clock is measured in the form of time.

Furthermore, these time measurement results are averaged for each change pattern. The jitter quantity caused by the inter-symbol interference is detected for each change pattern. By using the jitter quantity thus detected, the compact disk 41 executes the computation processing of the equation (1), which is based on the delay time difference τ between taps of the delay circuit 22 (FIG. 3) and which includes the jitter correction unit. By taking the center tap of the delay circuit 22 as the reference, the tap position of the delay circuit 22 capable of canceling the detected jitter quantity is detected. The data specifying this tap position is stored in the read only memory as the correction value data DF. As a result, the correction value table 20 is formed.

By thus forming the correction value table 20, the audio data D1 and subcode data input from the digital audio tape recorder 3 (FIG. 1) are subjected to stipulated data processing in the modulation circuit 13 and converted to the EFM signal S2, which changes in signal level while taking the fundamental period T as the unit. This EFM signal S2 is converted in signal level to the TTL level by the level conversion circuit 15. Thereafter, the clock CK is reproduced by the PLL circuit 16. In the rising edge correction circuit 17A and the falling edge correction circuit 17B (FIG. 3), the signal is successively latched in the 13-stage latch circuits 19A through 19M, and the change pattern is detected.

Furthermore, the EFM signal S2 is input from the latch circuit located at the middle of the latch circuits 19A through 19M to the monostable multivibrator 21. The monostable multivibrator 21 is triggered at the timing of the rising edge in the rising edge correction circuit 17A and at the timing of the falling edge in the falling edge correction circuit 17B. In the rising edge correction circuit 17A and the falling edge correction circuit 17B, the rising pulse signal and the falling pulse signal which rise in signal level respectively at the timing of the rising edge and the falling edge are generated, respectively.

Respectively in the delay circuits 22 of the rising edge correction circuit 17A and the falling edge correction circuit 17B, the rising pulse signal and the falling pulse signal are successively delayed while taking the delay time τ used to calculate the correction value data DF as the unit. Tap outputs of this delay circuit 22 are output to the selector 23. As for the change pattern of the EFM signal S2 detected by the latch circuits 19A through 19M, accessing the correction value table 20 by using the latch outputs of the latch circuits 19A through 19M yields detection of the corresponding correction value data DF. By this correction value data DF, contacts of the selector 23 are switched.

Respectively from the selectors 23 of the rising edge correction circuit 17A and the falling edge correction circuit 17B, the rising edge signal SS and the falling edge signal SR respectively corrected in timing of the rising edge and the falling edge of the EFM signal S2 so as to correct the jitter detected in the compact disk 41 for evaluation are output. The rising edge signal SS and the falling edge signal SR (FIG. 1) are combined by the flip-flop 25. The output signal S5 of the flip-flop 25 is corrected in signal level by the inverse level conversion circuit 26. As a result, the modulation signal S1 corrected in timing of each edge of the EFM signal S2 so as to correct the jitter detected on the compact disk 41 for evaluation, i.e., so as to reduce the inter-symbol interference is generated. By this modulation signal S1, exposure of the original disk 2 is conducted.

As a result, pits are formed successively on the original disk 2 with edge positions corrected so as to cancel the inter-symbol interference. From this original disk 2, a compact disk significantly reduced in jitter as compared with the conventional compact disk is produced.

In the configuration heretofore described, the modulation signal S1 is generated by correcting the timing of the EFM signal S2 according to the change pattern of the EFM signal S2, and the original disk 2 is exposed to light by using this modulation signal S1. As a result, the jitter caused by the inter-symbol interference changing according to the change pattern can be reduced significantly as compared with the conventional compact disk.

Furthermore, at this time, the compact disk for evaluation is produced and the correction value data DF is generated. Therefore, even if the production condition of the compact disk has changed, the compact disk can be produced by means of always proper correction value data DF by newly deriving the correction value data DF.

(2) Second Embodiment

Figure 6:
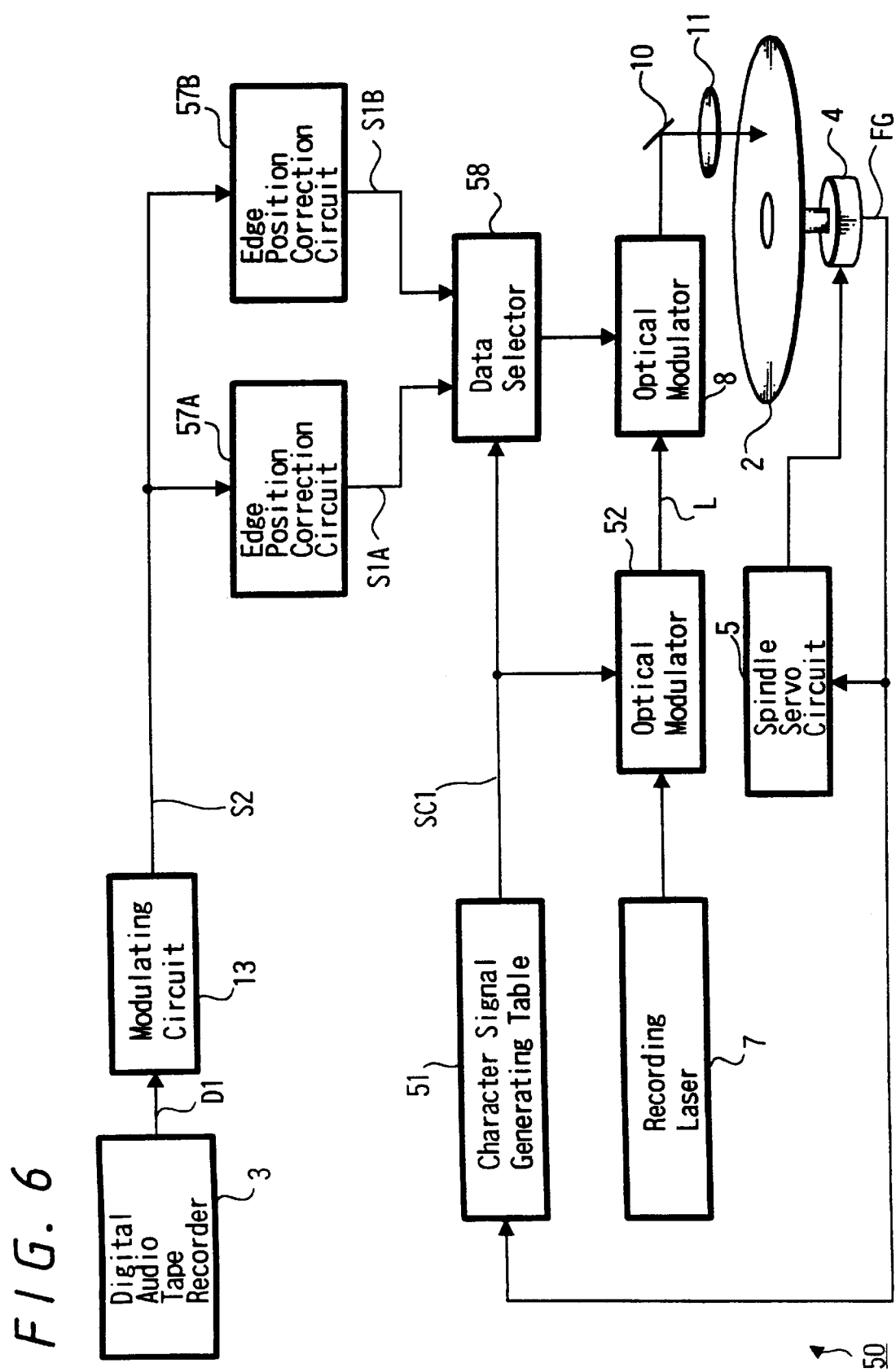
FIG. 6 is a block diagram showing an optical disk device according to a second embodiment of the present invention.

FIG. 6 is a block diagram showing an optical disk device according to a second embodiment of the present invention. In this optical disk device 50, the light quantity of the laser beam L is made to rise at a predetermined timing, and the original disk 2 is exposed to the light. Thereby, a pit widened in width is locally formed, and the reflectance of the compact disk is locally changed. So as to make a character, an image, and the like observable and confirmable with eyes by this local change of reflectance, the character, the image and the like are recorded on the information recording surface of the compact disk in this optical disk device 50. In the components shown in FIG. 6, the same components as those of the optical disk device 1 described before with reference to the first embodiment are denoted by corresponding reference numerals and duplicated description thereof will be omitted.

That is, in this optical disk device 50, a character signal generation circuit 51 outputs a light quantity switching signal SC1, drives a light modulator 52 inserted in the optical path of the laser beam L, and thereby switches and controls the light quantity of the laser beam L.

Figure 7:
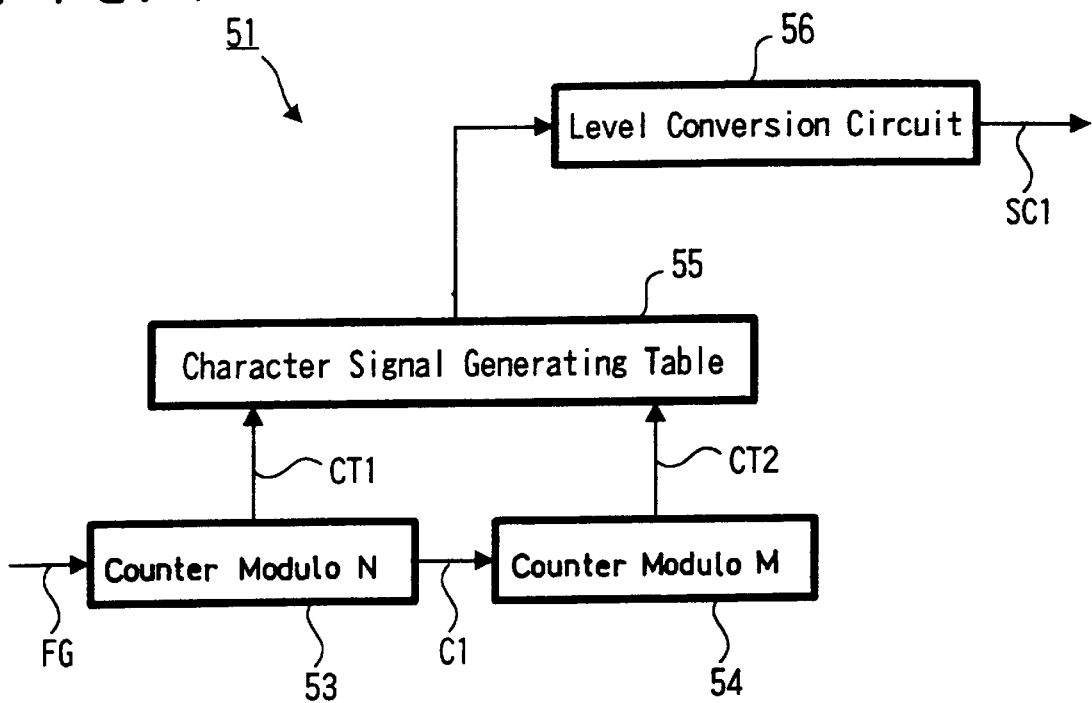
FIG. 7 is a block diagram showing a character signal generation circuit included in the optical disk device of FIG. 6.

In the character signal generation circuit 51, as shown in FIG. 7, a counter modulo N 53 is formed by a ring counter, counts the FG signal FG, and outputs a count value CT1. At a rotation period of the spindle motor 4, the count value is switched to 0. At this time, a track signal C1 is output.

A counter modulo M 54 is formed by a counter modulo M counting the track signal C1, and outputs a count value CT2. By using the counter modulo N 53 and the counter modulo M 54, the character signal generation circuit 51 outputs the count values CT1 and CT2, which respectively represent positions of the original disk 2 in the circumferential direction and in the radial direction.

A character signal generation table 55 is formed by a read only memory circuit which holds pixel values of various kinds of character information. By using the count values CT1 and CT2 as an address, the character signal generation table 55 outputs data of each pixel value. The data of each pixel value is formed by data of each bit which represents, in a bit map form, the characters and image to be recorded on the original disk 2.

Figure 8:
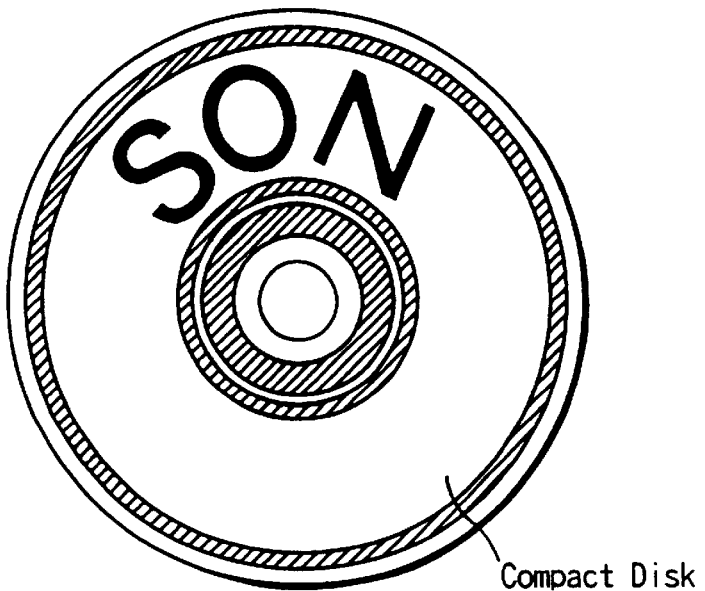
FIG. 8 is a top view showing a compact disk produced by the optical disk device of FIG. 6.

A level conversion circuit 56 successively latches the data of pixel values successively input, and outputs them with a signal level suitable for driving the light modulator 52 (FIG. 6). In this embodiment, the light modulator 52 is thus driven to switch the light quantity of the laser beam L from the light quantity of 100% to the light quantity of 85%. As a result, the characters, image and the like are recorded on the surface of the disk as shown in FIG. 8.

Figure 11:
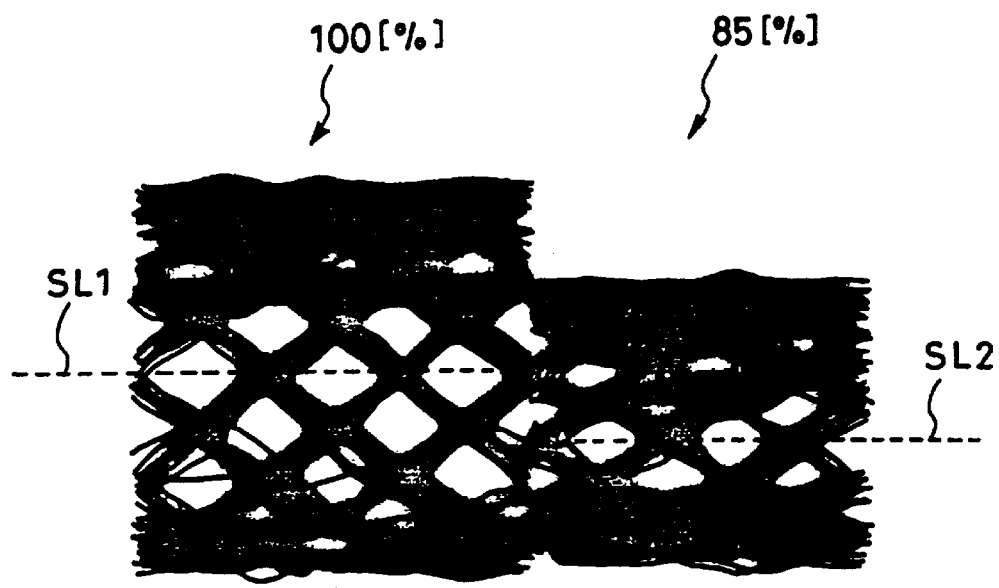
FIG. 11 is a signal waveform diagram showing a change in slice level caused by a difference in light quantities.

If the light quantity of the laser beam L is thus controlled to be switched from the light quantity of 100% to the light quantity of 85%, the reproduced signal also changes. To be concrete, amplitude W1 and W 2 of the reproduced signal change as shown in FIGS. 9 and 10 respectively illustrating eye patterns of the reproduced signals using the light quantity of 100% and the light quantity of 85% as shown in FIG. 11. If it is observed as a continuous waveform, a slice level SL1 for correctly converting the reproduced signal to a binary value in the case of the light quantity of 100% is different from a slice level SL2 for correctly converting the reproduced signal to a binary value in the case of the light quantity of 85%. In other words, asymmetry in the portion obtained with the light quantity of 100% changes largely from that in the portion obtained with the light quantity of 85%.

Conventional compact disk players have an automatic slice level adjusting circuit for correcting the slice level according to such a change in asymmetry. If the light quantity of the laser beam L is abruptly changed to emphasize the contour so as to make the recorded characters, image and the like clearly observable and confirmable with eyes, however, it eventually becomes difficult for the automatic slice level adjusting circuit to follow such an abrupt change. In the boundary portions of the characters, image and the like, therefore, very long burst errors occur.

In this embodiment, therefore, modulation signals S1A and S1B respectively corresponding to the light quantities of 100% and 85% are output from two edge correction circuits 57A and 57B. The modulation signal S1A or S1B is selected by a data selector 58 in an interlinked relation to the switching of the light quantity of the laser beam L.

Thus, in the optical disk device 50, the light quantity of the laser beam L is switched over, and the modulation signal S1A or S1B is selected to vary the timing of exposure to the laser beam according to the pit width thus changed. As a result, the edge position in each pit is varied so as to correspond to the change of the pit width. In the compact disk produced by this original disk 2, pits to which the same data is allocated are formed to be different in pit length so as to correct a change in the returned light caused by a difference in pit width.

At this time, the degree of the inter-symbol interference for respective light quantities also changes due to a change in pit width. According to the change pattern of the EFM signal S2, therefore, timings of the modulation signals S1A and S1B are varied by the edge position correction circuits 57A and 57B, respectively. As a result, the jitter is reduced. Thus, the edge position correction circuits 57A and 57B hold the correction value data DF respectively produced by the light quantities of 100% and 85% in the correction value table.

Figure 12:
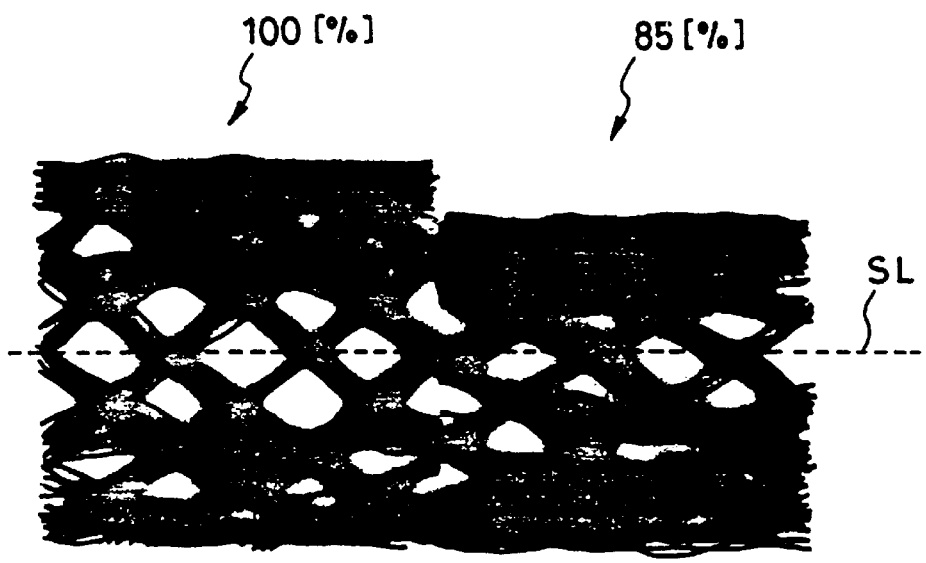
FIG. 12 is a signal waveform diagram showing a reproduced signal obtained from the compact disk of FIG. 8, in comparison with FIG. 11.

As shown in FIG. 12 illustrating a result observed in an experiment, the change of asymmetry could be effectively avoided by switching over the timing of the modulation signal. With a slice level SL, therefore, the reproduced signal obtained from the light quantity of 100% and the reproduced signal obtained from the light quantity of 85% could be accurately converted to a binary value.

In the configuration shown in FIG. 6, the modulation signal S1A and S1B are switched over by the data selector 58 to switch over the timing of the modulation signal in an interlinked relation to the switching of the light quantity of the laser beam. As a result, the reproduced signal can be accurately converted to a binary value by using a single slice level. Accordingly, errors can be effectively avoided and data can be reproduced precisely.

(3) Other Embodiments

In the above described embodiments, the case where the correction value table produced by using the compact disk for evaluation is directly used to produce a compact disk has been described. However, the present invention is not limited to this, but by using the correction value table produced by means of the compact disk for evaluation, a compact disk for evaluation may be newly produced so as to modify the correction value table by using the newly produced compact disk for evaluation. If the correction value table is thus modified repeatedly, the jitter can be reduced positively by that amount.

In the above described embodiments, the case where the EFM signal is sampled 13 times to detect the change pattern has been described. However, the present invention is not limited to this, but the number of sampling points may be increased, if necessary, to thereby cope with a longer recording information pattern.

In the above described embodiments, the case where the jitter quantity is measured by measuring the time of the binary signal based upon the fundamental clock and the correction value data are generated from the measurement results has been described. However, the present invention is not limited to this. In the case where a practically sufficient precision can be assured, the correction value data may be generated by signal level detection of the reproduced signal based upon the fundamental clock instead of the measurement of the jitter quantity using this time measurement. In this case, error voltage from the detected signal level of the reproduced signal the slice level is calculated, and correction value data is calculated from the error voltage and the transient response characteristic of the reproduced signal.

In the above described embodiments, the case where the timing of the modulation signal is corrected according to the correction value data stored in a table form has been described. However, the present invention is not limited to this. In the case where a practically sufficient precision can be assured, the correction value data may be calculated by computation processing instead of the correction value data detected beforehand and the timing of the modulation signal may be corrected by using the correction value data thus calculated.

In the above described embodiments, the case where the correction value data is calculated by using the compact disk for evaluation has been described. However, the present invention is not limited to this. In the case where the present invention is applied to, for example, an optical disk device of a write-once type, the correction value data may be calculated on the basis of trial writing result in a so-called trial writing area.

In the above described embodiments, the case where the present invention is applied to the compact disk has been described. However, the present invention is not limited to this, but the present invention can be widely applied to optical disk devices for recording various data by using pits. The present invention can be widely applied to optical disk devices adapted to conduct multi-value recording of various data by difference in transient response characteristics of the reproduced signal.

In accordance with the present invention, the timing of the modulation signal is corrected according to the change pattern of the modulation signal as described above. As a result, the jitter caused by the inter-symbol interference can be reduced. The reading margin can be improved by that amount, and recorded data can be reproduced surely.

Furthermore, in an interlinked relation to the switching over of the light quantity of the laser beam, the timing of the modulation signal is corrected. Thereby, asymmetry is corrected, and data can be reproduced accurately with a single slice level. Furthermore, degradation of jitter caused by the light quantity switching over of the laser beam can be effectively avoided. From these facts, it becomes possible to record an image, a character and the like, and surely reproduce recorded data.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. An optical ROM disk having desired data recorded thereon by a pit formed on a recording surface, the optical ROM disk produced by injecting resin into a stamper mold produced from a mother disk, wherein a position of each edge of a pit of said optical disk is changed from a fundamental position according to a pit length and a land length located before and behind said edge by switching a signal level of a modulation signal at a period equivalent to an integer multiple of a predetermined fundamental period according to data to be recorded, wherein on-off control is conducted on a laser beam by using said modulation signal to thereby record said data on a disk-like recording medium by correcting a timing of said modulation signal according to a change pattern of said modulation signal detected by a series of latch circuits, and wherein the shape of said pit of said optical disk is modified to correspond to said change pattern of said modulation signal on the basis of correction data corresponding to outputs of the latch circuits and read out of a correction table.

2. The disk of claim 1, wherein predetermined data are recorded on a separate disk-like recording medium and a reproduction result is obtained, or said data are recorded on said disk-like recording medium and the reproduction result is obtained, and timing of said modulation signal is corrected on the basis of said reproduction result.

3. The disk of claim 2, wherein a reproduced signal obtained by reproducing said disk-like recording medium is converted to a binary signal with a predetermined slice level, wherein a timing of an edge of said binary signal for said fundamental period is detected whenever said change pattern occurs, and wherein said reproduction result comprises a result of said detection.

* * * * *

UNITED STATES PATENT AND TRADEMARK OFFICE
CERTIFICATE OF CORRECTION

PATENT NO.    : 6,333,905 B2
DATED         : December 25, 2001
INVENTOR(S)   : Seiji Kobayashi et al.

It is certified that error appears in the above-identified patent and that said Letters Patent is hereby corrected as shown below:

<u>Column 5,</u>
Lines 3, 12, 33, 34 and 38, delete all "α"'s and insert in their place -- Δ --.

<u>Column 7,</u>
Lines 10, 13, 17 and 50, delete all "α"'s and insert in their place -- Δ --.

Signed and Sealed this

Twelfth Day of November, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.      : 6,333,905 B2
DATED           : December 25, 2001
INVENTOR(S)     : Seiji Kobayashi et al.

It is certified that error appears in the above-identified patent and that said Letters Patent is hereby corrected as shown below:

Column 5,
Lines 3, 12, 33, 34 and 38, delete all "α's" and insert in their place -- Δ --.

Column 7,
Lines 10, 13, 17 and 50, delete all "α's" and insert in their place -- Δ --.

Signed and Sealed this

Nineteenth Day of November, 2002

*Attest:*

*Attesting Officer*

JAMES E. ROGAN
*Director of the United States Patent and Trademark Office*